INVENTOR.
WALLACE E. ALMQUIST

Nov. 13, 1962 W. E. ALMQUIST 3,063,220
VAPOR-LIQUID CONTACTOR AND SEPARATOR
Filed June 10, 1957 2 Sheets-Sheet 2

SECTION B-B

SECTION A-A

SECTION C-C

INVENTOR.
WALLACE E. ALMQUIST
BY
ATTORNEY

United States Patent Office
3,063,220
Patented Nov. 13, 1962

3,063,220
VAPOR-LIQUID CONTACTOR AND SEPARATOR
Wallace E. Almquist, 30 Oak Glen Drive, Oakmont, Pa.
Filed June 10, 1957, Ser. No. 664,721
2 Claims. (Cl. 55—225)

My invention relates to vapor systems and more particularly to an improved vapor liquid contactor and separator.

In accordance with the prior art of which I am aware, several attempts have been made to provide a gas cleaner for removing foreign material such as dust and liquids in the vapor and liquid and solid phases from a gas stream. One of these devices is an oil scrubbing cleaner. The oil scrubbing cleaner is a contacting device for bringing dirty gas in contact with oil to wet down or attach the dirt particles and then removing the oil particles, which have been entrained and which contain dirt, from the gas. Because of the difficulty in removing the entrained oil from the gas after contacting many sacrifices have been made in the contacting or scrubbing efficiency in order to keep the oil loss from the entrainment separator at a reasonable figure.

Several cleaners have recently been designed which are built for low oil loss but these devices have tended to disregard the primary function of dirt removal in an effort to reduce this oil loss. The cleaners which do effectively remove the dirt lose too much oil in doing so, and it becomes a close question as to which causes the most trouble, the original dirt or the oil lost from the cleaner which is employed to remove the dirt.

In an attempt to eliminate unreasonable oil loss two cleaners have received considerable attention in the past few years, namely, the cyclone and the filter. The cyclone employed in the prior art is a device substantially circular in the interior with openings extending from the outside through which gas is fed into the interior. The gas fed into the interior of the cyclone rotates around in circular manner and the dirt theoretically falls out. However, it has been found in practice that the cyclones of the prior art do not give complete or even adequate removal of dust or liquid and also must operate within definite limitations to achieve even a reasonable separation. Because the wide fluctuations in gas flows cause wide variations in separating efficiency, because pressure drops are too high at elevated pressures and because erosion of the cyclone tubes gives a serious maintenance problem, the cyclones have not proved satisfactory for most gas cleaning purposes. In addition, the cyclones now under use do not effectively remove dirt under 20 microns particle size, but rather re-entrain these particles and carry them with the gas through the system.

The filter can be designed to give good separation of dirt from the gas stream but is not a reliable device to have on a gas line where there is not constant attendance and which must provide continuous flow. Installed on a low pressure system the filter is subject to stoppage or break-through when packed with dirt. At higher pressures, the filter simply breaks through when packed and the dirt is carried downstream. Since the rate of movement of dust in a line is unpredictable, and most installations are unattended, the stoppage or break-through could easily occur and do its damage before anyone was able to correct the condition.

It is accordingly an object of my invention to provide a gas cleaner which provides continuous and effective dirt removal and low oil loss over a wide range of velocities.

It is another object of my invention to provide higher contacting velocity than the present oil cleaners being used.

It is another object of my invention to provide apparatus for improved dehydration of a gas by absorption.

It is still another object of my invention to cause the dispersion of oil in a gas cleaner into finer droplets.

It is still another object of my invention to provide a controlled oil contactor for gas wherein the level of the oil in the system is a function of the rate of flow of gas through the system.

It is an ancillary object of my invention to provide an improved gas cleaner.

It is still another object of my invention to provide a cyclone separator which operates with low pressure loss and which does not re-entrain liquid which it has already separated from the gas stream.

It is another ancillary object of my invention to provide an improved primary separator.

It is another object of my invention to provide an improved mesh cleaner.

It is another object of my invention to provide a new and useful apparatus.

The novel features that I consider characteristic of my invention are set forth with particularity in the appended claims. The invention itself, however, both as to its organization and its method of operation, together with additional objects and advantages thereof, will best be understood from the following description when read in connection with the accompanying drawing in which:

Figures 1, 6:
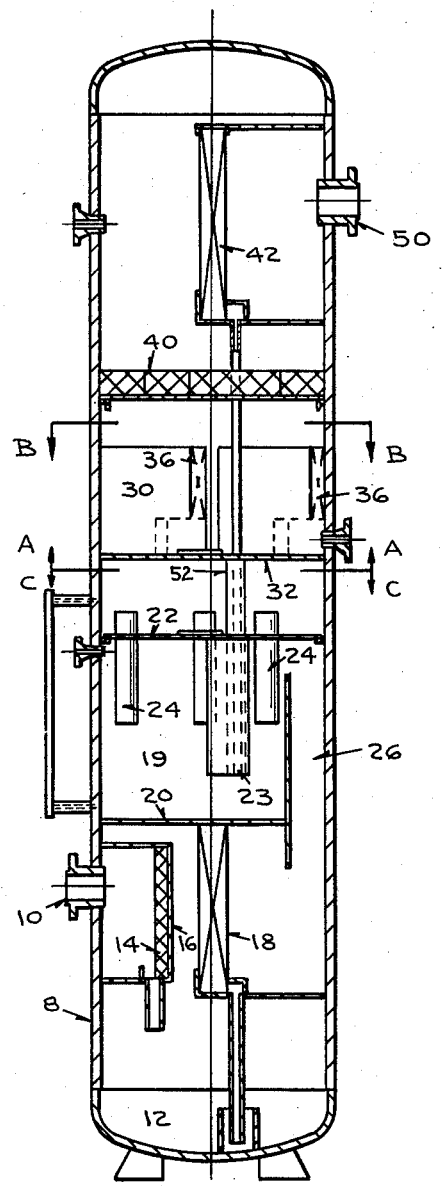
FIGURE 1 is a showing partly in section of a gas cleaner in accordance with the preferred embodiment of my invention.
FIGURE 6 is a schematic showing of a steam generator connected to the apparatus shown in FIGURE 1.
Figure 7:
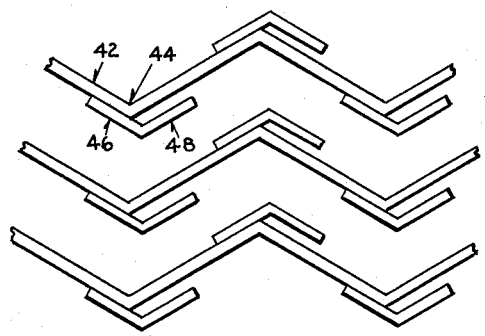
FIGURE 7 is a showing in cross section of a vane type separator as employed in the preferred embodiment of my invention.
Figure 2:
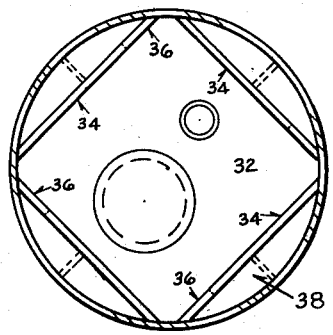
FIGURE 2 is a cross sectional view of the apparatus shown in FIGURE 1, taken along the lines B—B of FIGURE 1.
Figure 3:
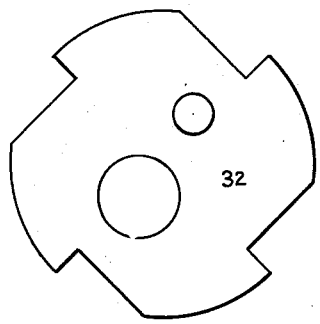
FIGURE 3 is a cross sectional view of the apparatus shown in FIGURE 1, taken along the lines A—A of FIGURE 1.
Figure 4:
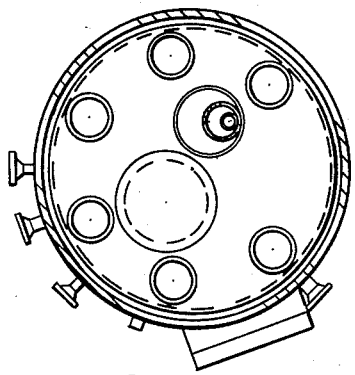
FIGURE 4 is a cross sectional showing of the apparatus shown in FIGURE 1, taken along the lines of C—C of FIGURE 1.
Figure 5:
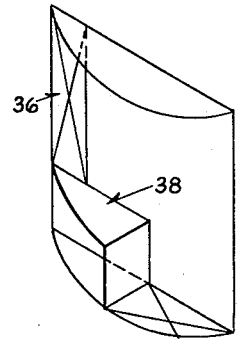
FIGURE 5 is an isometric sketch of a primary separator segment as employed in the preferred embodiment of my invention.

In accordance with the preferred embodiment of my invention I provide an elongated vertical circular tank 8, having walls preferably of carbon steel. Approximately one-quarter of the way up said tank 8 from the bottom I provide an inlet opening 10 for introduction of gas to said tank. In the bottom of the tank below said inlet opening I provide an open area as a reservoir 12 for oil or other liquid removed from the flowing gas stream. Opposite said opening 10 in the path of gas passing through said opening 10, I provide a wire mesh baffle impingement separator 14 which comprises a wire mesh preferably made of stainless steel wire woven thick, having a plate 16 of material resistant to the flow of gas located behind and adjacent to the wire mesh. Beyond the said wire mesh impingement separator 14 and also in the path of said gas, I provide a vane type mist extractor 18. The aforesaid separator 14 and extractor 18 are provided to remove any liquid in the gas entering the tank. The mesh impinger serving primarily to remove any liquid slugs and the extractor to remove any remaining droplets.

Above the wire mesh impingement separator 14 and the said vane type extractor 18, I provide a contactor chamber 19 comprising a liquid-proof vessel having a floor 20 and a ceiling 22. This contactor vessel is partially filled with oil or other liquid. For example it may also be filled with water or a water absorbing liquid if it is desired to humidify or dehumidify a gas.

Extending through the ceiling of the contactor are a plurality, preferably six or more gas pipes 24. These gas pipes 24 extend from a point a short distance above said ceiling partition 22 to a point substantially below said ceiling 22 into the area of said contactor chamber 19. Normally, the oil level in said chamber 19, when gas is not passing through said chamber, is a short distance above the bottom edge of said gas pipes. An oil return pipe 23 is provided which extends from the ceiling of the contactor chamber to a point substantially below the level of said gas pipes. The return pipe extends below the gas pipes so as to cause the gas to pass through the gas pipes rather than the return pipes. The purpose of the oil return pipe is to allow oil swept up by the gas to flow back into the reservoir.

Beside the contactor chamber preferably along one wall of said tank, I provide a passage 26 for gas, said passage extending from the area below said contactor chamber to the region between the ceiling of said contactor chamber and the top of the oil in said contactor chamber.

Located above the contactor section is a centrifugal primary separator 30. The centrifugal primary separator comprises a chamber, the floor of which is a partition 32 extending across said tank perpendicular to the axis of the tank. In contact with the floor 32 of the separator are a plurality of plates 34 extending as chords to the circumference of said tank 8 and being in a plane parallel to the axis of said tank 8. Each of these plates is fastened along the lower part of its side edges to the walls of the tank. The plates together form substantially a polygon, adjacent edges of said plates being separated by only a small distance. At one end, each of said plates has a rectangular cut away portion 36, the said rectangular cut away portions 36 being located a distance approximately one third of the way up said plates 34 from the floor 32 of said separator 30 to the top of said plates 34 and extend from there to the top of said plates. These rectangular cut away portions 36 are the apertures from which the gas enters the primary separator chamber 30. The primary separator chamber 30 is the area enclosed by the several plates 34. A directional plate 38 for controlling the direction of flow of the gas is attached perpendicular to each of said wall plates 34. Each directional plate 38 extends parallel to the floor 32 of said primary separator 30 and is located at the bottom edge of each of said cut away sections. The said directional plates 38 extend from the wall plates 34 to the wall of the tank 8, being therefore straight edged on two sides and curved to fit the wall of the tank on the third side. Each of the directional plates 38 lies in a plane parallel to the floor 32 of the separator 30 and extends from the point of contact between the adjacent wall plate 34 and the wall of the tank 8 and a point approximately in the center of said wall plate 34. A box is thus provided comprising the directional plate 38, the floor 32 of the separator, the wall of the tank 8 and a portion of the first mentioned wall plate 34. The fourth side of this box is covered with a rectangular plate of the same material as the other plates. The chamber thus enclosed has no significance but is dead space. The provision of the directional plate causes gas passing out of the aperture 36 of the primary separator into the interior of the primary separator 30 to be traveling perpendicular to the axis of the tank 8.

Above the primary separator section 30, I provide an agglomerator section 40. The agglomerator 40 is a wire mesh of a type well known in the art. The agglomerator mesh extends across the tank 8 so that all gas leaving the primary separator 30 must pass through the agglomerator 40.

Above the agglomerator 40 I provide a vane type mist extractor. The vane type mist extractor employed here is similar to extractor 18 at the bottom of the tank 8 and comprises a plurality of plates extending parallel to each other in a zigzag manner. Thus, one of said plates extends from a first point at an angle of about 30 degrees to the general direction of said vanes 42 for a distance of about one and one-quarter inches. The vane then turns at approximately a 60 degree angle. On the outside of each curve at the point of curvature 44 I provide a catch pocket. The catch pocket comprises substantially two plates which may be a continuation of one piece. The first plate 46 extends along one side of the vane to the point of bending, and continues on a short distance beyond said point of bending into the open area. The second plate 48 is fastened to the end of the first plate in the open space beyond the point of bending and continues parallel to the main body of the vane beyond the point of bending. Each of the said last mentioned segments of the wall of the catch pocket is approximately $7/16$ of an inch long. The open area thus provided between the vane 42 and the second segment 48 of the last mentioned plate is the catch pocket. The catch pocket extends in a vertical manner so that oil catching in said catch pocket will run down to the bottom of the separator vanes 42. From the far side of the separator vanes the gas passes out of the tank through an outlet opening 50 in said tank 8.

In the operation of my device dirty gas containing liquids thus enters the input aperture near the bottom of the tank and then impinges against the impingement separator mesh 14. The mesh removes most of the liquid which is sometimes present in a gas line allowing it to fall into the reservoir below. The gas flowing into the mesh and being turned aside by the baffle plate behind the mesh loses any droplets of liquid which it is carrying without re-entraining. I have found that the combination of the mesh with the baffle plate produces a much greater separating effect than would be due to the cumulative effects of the mesh and the baffle plate separately.

Next the gas passes through a vane type separator where the finer droplets of liquid or mist is removed, and which also falls to the bottom of the tank.

The gas then passes from the first vane separator 18 where the preliminary oil has been removed up the passageway 26 between the wall of the tank 8 and the contactor wall into the area above the oil in the contactor section 19. In the contactor section 19 the gas passes under the lower edge of the pipes and then up through the pipes into the area above the contactor section.

In the prior art, the contactors have used a small number of larger diameter pipes in preference to a larger number of small diameter pipes to achieve the same total cross-sectional area of pipes, which sets the contacting velocity. This situation has gradually developed from economic and structural considerations. For instance, one 8-inch diameter pipe will pass the same amount of gas as sixteen 2-inch pipes at the same velocity, and can be installed at much less cost. The size of the pipes were made larger as the size of the cleaner increased, without consideration of the adverse effects of such design. It was not realized that using larger diameter pipes at the same time provided much less total circumference, in proportion to the pipe cross-sectional areas.

Since the gas, in order to get into the pipes, must first pass under the lower edges or total circumference, the less circumference provided, the greater depth the gas must take between pipes and oil level to get the same volume under this edge. As the gas forces this greater depth of flow pattern under the pipes, it forces more oil into circulation. Thus, for the same contacting velocity, the same flow of gas forces approximately four times as much oil into circulation when 8″ pipes are used as compared to 2″ pipes. The operators of cleaners of the prior art have found through experience that they have to start with less oil in the cleaner than recommended or the loss of oil will be too great. The serious feature of this is that the cleaner does not have sufficient oil for proper contacting at low gas flows, and the gas escapes cleaning. The older cleaner can clean effectively only over a narrow flow range, being limited by excessive oil loss on one hand and poor cleaning on the other.

The gas passes up through the pipes 24 carrying with it a large amount of oil which is swept up from the oil bath below. In the prior art a large opening was provided for the oil to fall back into the region of the bath below. When the velocity of the gas was high and a great deal of oil was carried up through it was difficult to remove all of the excess oil. Operators, therefore, frequently set the oil at a lower level so that an excess of oil would not be put into circulation, this level being frequently below the level of the bottom of the pipes. When a large amount of gas was passing through per unit time the gas would sweep up the oil into the pipes without difficulty, thereby obtaining a good cleaning action; however, if the velocity of the gas dropped, the gas would pass over the surface of the oil without disturbing the oil and without being cleaned, would pass on into the regions beyond. In the preferred embodiment of my invention the rate of flow of the oil back into the lower tank 19 is controlled, by having the return pipe 23 of small cross section. The return pipe 23 should be of cross-sectional area between 10% and 30% of the total area of the pipes 24, in accordance with the preferred embodiment of my invention. Thus when the gas is passing through with great velocity the oil level below drops because a great amount of oil is carried up above and it is slow in draining back through the return channel 23 into the region below. On the other hand when the velocity of the gas slows down the oil level above falls and the oil level in the region below rises. When the velosity of the gas is low, the oil level in the contactor oil reservoir raises above the bottoms of the pipes 24 thus, even with a small velocity of gas the gas is forced to mix with the oil in order to get into the region beyond, thereby producing a cleaning action. I have thus provided a variable or controlled oil level contactor.

The gas passes from the contactor section 19 up through the floor plate 32 of the primary separator 30 into the region between the walls 34 of the separator and the sides of the tank 8. The gas passes over the directional plates 38 between the walls 34 of the separator and the walls of the tank 8 and passes out through the aperatures 36 in the walls of the separator into the interior of the separator. As the gas passes out through an aperature 36 into the separator, it is traveling substantially tangentially to the wall of the tank and perpendicular to the axis of the tank 8. It thus strikes against the side of the next partition or wall of the separator adjacent to the wall through which it has come. The gas is thus deflected by the next wall which extends in a straight line, the gas being forced hard against the wall of the separator at its point of contact with the wall of the tank nearest the aperature from which the gas has come, and then deflects out gradually into the interior of the separator. The particles of entrained dust and oil strike against the said next partition and are blown along that wall a short distance by the gas, the gas pressure and velocity gradually decreasing as the particles move along the wall. Thus, I have provided a centrifugal device wherein the gas is not re-entrained as is the case in devices of the prior art, but, instead, due to the gradual drop in velocity of the gas as the particles move along the flat wall of the separator and gradual movement of the gas away from the wall, the collected liquid drops to the collection pan below without re-entraining. As the droplets of oil collect they agglomerate and flow downward. Since the gas has been allowed to enter a substantial distance above the floor of the separator, there is an area below the level of the swirling gas where the oil can collect, without being re-entrained, and then flow down into the reservoir. The gas then passes up to the agglomerator 40.

On the agglomerator 40, if the velocity is low, droplets will collect, agglomerate and drop down to the floor of the primary separator; however, if the vertical gas velocity is high, small particles of oil will collect, they will agglomerate into larger particles of oil or droplets and these droplets will then be blown upward with the gas. These larger droplets of oil carried with the gas pass through the second vane separator 42 where they are collected and flow back down through the pipe provided into the oil reservoir of the contactor section. After passing through the second vane separator 42, the gas then passes out of the tank through the output aperature 44 near the top of the tank.

In the prior art the introduction of make-up water to a steam system has presented a substantial problem. This is because the make-up water being put into the steam system must be free from salt impurities in the water. Accordingly it has been the practice to distill the make-up water before introducing the water into the steam system or to treat the water by chemical and physical processes. In accordance with one embodiment of my invention I provide a method of purifying and introducing make-up water into a steam system without the necessity of wasting heat.

In this embodiment of my invention, the apparatus shown in FIG. 1 has the contactor reservoir filled with water. Steam is introduced through the in-put opening in the tank, such steam being super-heated and under pressure, from some source such as a boiler 46. The super-heated steam passing through the water will cause some of the water to evaporate into steam. Also, the steam passing through the water will pick up some small droplets of water with it. These droplets contain impurities as does the rest of the water in the contactor section. The gasses, however, are carried upward to the cyclone liquid extractor thence through the agglomerator and then through the vane-type mist extractor before passing out through the outlet opening in the tank.

Thus, any droplets of water which are picked up by the steam are removed from the steam so that the steam passing out the outlet opening is for all practical purposes clean. By clean I mean that the solid content of the total steam can be maintained as 1.0 p.p.m. or less regardless of the feed water composition. Periodically the water in the contactor section is removed, or a portion of it is removed, and replaced with fresh water so as to maintain the solid content of the water in the contactor section at a relatively low level in the same manner that the oil in an oil contactor section must be removed periodically to remove the impurities therefrom.

I have thus provided a method of introducing make-up water into a steam system whereby no heat is lost from the system in obtaining the purification of the make-up water; and secondly, whereby substantially no impurities are introduced into the system along with the make-up water.

The rate of feed water flow can be controlled by any of several control means well known in the prior art such as the rate of flow control, a displacement pump, or a valve setting and the rate of admission of superheated steam controlled by control of the outlet steam temperature from the vessel. An alternate control can be obtained by setting the rate of flow of super-heated steam to the vessel and allowing the water to feed automatically to provide a constant outlet steam temperature. The outlet steam temperature should be set between 10 degrees and 50 degrees above the saturation temperature of the steam. In accordance with one embodiment of my invention as illustrated in FIGURE 1, I provide a displacement type liquid level controller. A liquid level controller comprises a pipe or channel extending from a point in the contractor chamber substantially below the bottom end of the pipes which extend through the ceiling of the contactor chamber, to a point in the region above the ceiling of the contactor chamber. It would appear to one skilled in the art of first studying such a device that a liquid level controller would be a poor solution to the problem because it is not desirable to have a constant level of liquid in the contactor section but instead that it is desirable to have a level of liquid which is higher for a low flow of gas and lower liquid level for a high flow of gas. However, I have found that when there is a high rate of flow of gas passing through the pipes leading out of the contactor chamber, there is a consequent increase in the pressure drop from the contactor chamber to the area above the ceiling of the contactor chamber. This pressure drop when there is a high rate of flow through the contactor chamber causes the liquid in the displacement type liquid level controller to rise above the level of the liquid in the contactor section. Thus, as the volume of gas per unit time passing through the contactor increases the apparatus will automatically cause a drop in the level of fluid in the contactor chamber. If a displacement type liquid level controller is employed it is not necessary that the opening in the ceiling of the contactor for allowing water or other fluid to pour back into the contactor chamber be of a restricting nature, but instead a large opening which will not restrict the flow may be employed.

In accordance with another embodiment of my invention I employ a temperature responsive control for controlling the level of water in the contactor. This temperature responsive control is located so as to measure the temperature of the output gases at some point beyond the contactor. However, I believe it is advisable to have in conjunction with the temperature responsive control a liquid level responsive control which is set to override the temperature control in case excessive water level accidentally gets built up especially during the periods of starting up the apparatus or shutting it down.

Deaeration of the water for removal of gases such as carbon dioxide and oxygen is relatively simple. A side stream of the circulating water can be removed from the vessel at a point pust above the feed entry where the temperature of the feed water has come up to the main body, flashed to a lower pressure for reduction of the gases, and pumped back into the vessel at a higher point where the steam and water contact takes place. If desired, a feed water pre-heating coil inside the water reservoir can be used for heating the water before flashing, thus eliminating any possibility of getting the gases into the steam.

The process in accordance with my invention may obviously be used for any similar process of eliminating non-volatile contamination from a vaporizable fluid by evaporating the volatile components into a gaseous stream and providing the necessary heat of vaporization.

It is also understood, in accordance with other embodiments of my invention, that the apparatus described herein may be used to remove undesirable vapors from a gas by absorption where these vapors are soluble in the liquid in the contactor section. For example when water is used in the contactor section it will cause a large portion of the sulphuric acid or $SO_3$ from the gas to be absorbed and the undesirable vapors dissolved in the water will be removed along with the water in the separator sections. In a like manner, gas may be dehydrated by use of a water absorbing liquid, such as, for example, a concentrated solution of calcium chloride or diethylene glycol, the fine drops of the water-absorbing liquid being separated from the gas in the separator sections.

In accordance with the preferred embodiment of my invention, a drain 52 is provided in the floor of the centrifugal separator. This drain is a controlled flow drain being in cross sectional area equal to between 2% and 10% of the total cross sectional areas of the orifices leading into the centrifugal separator. This drain also tends to control the level of fluid in the contactor section by limiting the rate of return of fluid from the centrifugal separator to the contactor.

Although I have shown and described specific embodiments of my invention, I am aware that other modifications thereof are possible; my invention, therefore, is not to be restricted except insofar as is necessitated by the prior art and the spirit of the invention.

I claim as my invention:

1. In combination: A baffle section comprising a plate substantially impervious to gas, a wire mesh on one side of and adjacent to said plate, an orifice disposed opposite said wire mesh so as to direct gas emitted therefrom toward said wire mesh in a direction substantially perpendicular to said plate, a contactor section comprising a chamber having walls, a floor and a ceiling, a liquid in said contactor section partially filling said contactor section, a plurality of pipes extending through said ceiling into said contractor section, a channel from said baffle section to said contactor section for carrying gas deflected by said baffle section into the region between the ceiling of said contactor section and the liquid in said contactor section, a return feed channel between the region above said ceiling and said contactor section for conducting liquid carried up through said pipes back into said contactor section, said return feed channel being in cross-sectional area between 10% and 30% of the total cross-sectional area of said pipes, a centrifugal separator chamber a plurality of orifices disposed to conduct gas from the region above said contactor chamber and to direct the gas against walls of the centrifugal separator chamber, a return drain between said centrifugal separator and said contactor for conveying liquid collected in said centrifugal separator chamber into said contactor section, said drain being in cross-sectional area equal to between 2% and 10% of the cross-sectional areas of the orifices leading into said centrifugal separator chamber.

2. A gas cleaner comprising a gas-liquid contactor chamber, a fluid storage chamber, channels for gas flow from said contactor chamber to said fluid storage chamber, a fluid return passage betwen said storage chamber and said contactor chamber extending below the bottoms of said channels, the cross-sectional area of said passage being between 10% and 30% of the total cross-sectional areas of said channels, a centrifugal separator, channels for gas from said storage chamber to said separator ending in orifices, a separator drain of cross-sectional area between 2% and 10% of the total cross-sectional areas of said orifices connected between said separator and said contactor extending below the bottoms of said first mentioned channels.

References Cited in the file of this patent

UNITED STATES PATENTS

| | | |
|---|---|---|
| 223,403 | Stewart | Jan. 6, 1880 |
| 1,114,874 | Fox et al. | Oct. 27, 1914 |
| 1,116,647 | Thurber | Nov. 10, 1914 |
| 1,123,232 | Brassert | Jan. 5, 1915 |
| 1,130,593 | Hausam | Mar. 2, 1915 |
| 1,536,592 | Klug | May 5, 1925 |

(Other references on following page)

UNITED STATES PATENTS

| | | |
|---|---|---|
| 1,926,262 | Campbell | Sept. 12, 1933 |
| 2,087,219 | Dorfan | July 13, 1937 |
| 2,091,421 | Sherman | Aug. 31, 1937 |
| 2,222,565 | Kraft | Nov. 19, 1940 |
| 2,232,265 | Place | Feb. 18, 1941 |
| 2,246,349 | Crum | June 17, 1941 |
| 2,250,925 | Babcock | July 29, 1941 |
| 2,308,721 | Sebald | Jan. 19, 1943 |
| 2,399,384 | Pross | April 30, 1946 |
| 2,409,558 | Gunn | Oct. 15, 1946 |
| 2,452,859 | Moody | Nov. 2, 1948 |
| 2,460,706 | Metzer | Feb. 1, 1949 |
| 2,497,136 | Patterson | Feb. 14, 1950 |
| 2,556,250 | Baumann | June 12, 1951 |
| 2,560,069 | Bloomer | July 10, 1951 |
| 2,562,007 | Whittaker | July 24, 1951 |
| 2,590,681 | Campbell | Mar. 25, 1952 |
| 2,668,754 | Lichtenfels | Feb. 9, 1954 |
| 2,678,110 | Madsen | May 11, 1954 |
| 2,760,765 | Roop | Aug. 28, 1956 |
| 2,805,734 | Riess et al. | Sept. 10, 1957 |
| 2,805,846 | Dewan | Sept. 10, 1957 |
| 2,812,034 | McKelvey | Nov. 5, 1957 |

FOREIGN PATENTS

| | | |
|---|---|---|
| 348,124 | Great Britain | May 8, 1931 |